United States Patent
Takata et al.

[15] 3,692,768
[45] Sept. 19, 1972

[54] NACREOUS PIGMENTS FROM NUCLEIC ACID DERIVATIVES

[72] Inventors: Toyoharu Takata; Keisuke Fujii, both of Tokyo; Nobumitsu Yano, Saitama-ken; Masao Fukushima; Fumio Nagayoshi, both of Tokyo; Aiko Mizuno, Kawasaki-shi, all of Japan

[73] Assignee: Asahi Kasei Kogyo Kabushiki Kaisha, Osaka, Japan

[22] Filed: June 13, 1969

[21] Appl. No.: 833,152

[30] Foreign Application Priority Data

June 15, 1968   Japan.................43/140981
June 15, 1969   Japan.................43/140982

[52] U.S. Cl..................260/211.5 R, 99/92, 99/105, 99/34, 99/111, 99/144, 106/162, 106/193, 106/195, 106/272, 106/291, 260/41 C, 260/23 XA, 260/31.8 R, 424/61, 424/64
[51] Int. Cl. ..............................................C07d 51/50
[58] Field of Search...............................260/211.5 R

[56] References Cited

UNITED STATES PATENTS 3,347,846   10/1967   Yoshikawa et al..260/211.5 R
3,457,254   7/1969    Nobumitsu Yano et al.....................260/211.5 R

*Primary Examiner*—Lewis Gotts
*Assistant Examiner*—Johnnie R. Brown
*Attorney*—Waters, Roditi, Schwartz & Nissen

[57] ABSTRACT

Synthetic nacreous pigments comprise at least one thin plate-shaped crystal having a length of 3 to 100 microns, a width of 1 to 40 microns and a thickness of 0.05 to 3 microns, said individual crystal being composed of one nucleic compound selected from the group consisting of nucleic bases, nucleosides and nucleotides. The pigments are non!-toxic, have a strong resistance to chemicals, and thus are applicable to cosmetics or decoration of the surfaces of toys and tablewares, or food itself or improvement in the freshness of beverages.

10 Claims, No Drawings

NACREOUS PIGMENTS FROM NUCLEIC ACID DERIVATIVES

This invention relates to novel pearl essences and pigment bases containing at least one of plate-shaped crystal which is individually composed of one member selected from the group consisting of nucleic acids and their relative nucleic compounds as a raw material, a method for preparing the same and a method for endowing a pearl luster to various materials with the pearl essences and pigment bases.

An object of the present invention is to provide a synthetic nacreous pigment which is quite harmless to the human bodies and has an excellent pearl luster.

Another object of the present invention is to provide a novel method for depositing plate-shaped crystals of nucleic acids and their relative compounds having an excellent property as a raw material for the synthetic nacreous pigment.

Another object of the present invention is to provide a novel method for imparting a pearl luster to various materials.

Further objects and effects of the present invention will be clear from the description which follows.

Various pigments have been heretofore been used to improve the surface decoration of various materials. For example, pigment raw materials which can be used to decorate the surface of a material with a pearl luster, are inorganic compounds such as lead carbonate, bismuth chloride, etc, and fish platelets of herring, sprat, pilchards, etc. However, such inorganic compounds are toxic and have a relatively low resistance to chemicals, and thus are not suitable for the decoration of surfaces of various containers for cosmetics, food or beverages, or synthetic resin toys. On the other hand, such fish platelets are also not suitable as raw materials for modern industries where a mass production of products which meet a certain standard is always required, because of the quantitative restriction and seasonal availability of the raw material fish platelets and non-uniformity of the product quality.

The characteristics of pearl essences and pigment bases depend upon the refrangibility and shape of the particles. That is, the necessary conditions for generating a pearl luster are that the particle have a high refractive index and be in a thin plate form. Said pearl essences and pigment bases all consist of crystalline or non-crystalline thin plates having a high refrangibility, the pure substances of these inorganic compounds other than said fish platelets can be crystallized into a thin plate form during their manufacturing processes. On the other hand, considerable research has been done and a large number of studies have been made on the isolation and purification of fish platelets. For example, Japanese Pat. publication No. 4340/55 discloses a method for isolating and purifying guanine, a component of the fish platelets, and Japanese Pat. publication No. 25280/64 discloses a method for sublimation of guanine in a vacuum chamber. However, in the case of fish platelets, the constituents, guanine and hypoxanthine are crystallized in an unusual, mutual arrangement, and thus it is impossible to obtain guanine alone as plate-shaped crystals. In other words, the slight luster of needle-shaped crystalline guanine is only utilized as a modified fish platelet. Further, much effort has been given to crystallization of synthetic guanine or pure guanine and preparation of plate-shaped crystals to increase the pearl luster, but there have been no examples where guanosine or other nucleic compounds are used as pearl essences or pigment bases in a plate-shaped crystals form in a solution.

The present inventors have made various studies of the nature of pearl essences and pigment bases, and found that the nucleic compounds, which have been obtained only in a needle-shaped crystal form, can be successfully obtained in a plate-shaped crystal form by crystallization and that only plate-shaped crystals having specific sizes have an elegant pearl luster, and they based the present invention on said finding.

Generally, nucleic compounds have refractive indices as high as 1.7 to 1.9, and thus how crystals having an excellent luster can be obtained and how the pearl luster can be imparted to various materials are the objects of the present invention. In essence, it is found that obtention of crystals having smooth surfaces and such preferable crystal sizes as a length of 3 – 100 microns, a width of 1 – 40 microns and a thickness of 0.05 – 3.0 microns, particularly a length of 5 – 20 microns and a thickness of 0.05 – 1.0 micron is an object to the present invention.

In the present invention, the solubility of nucleic acids is important in preparing the pearl essences and pigments. Among the nucleic compounds, the nucleic bases have generally a very low solubility in water. For example, uric acid has a very low solubility in water, and only very fine white powders can be obtained according to the conventional method, and thin plate-shaped crystals cannot be satisfactorily obtained.

Further, nucleosides and nucleotides have high solubilities in water. For example, uridine has a very high solubility in water, and thus the crystals grow fast according to the conventional method. Not only do the surfaces grow, but also the thickness becomes extremely larger with the growth of surfaces. Thus, it is impossible to obtain crystals of the desired sizes by conventional methods.

As a result of various studies, the present inventors have found a method for crystallizing thin-plate shaped crystals of the respective materials by skillfully utilizing a difference in solubilities of nucleic compounds in various solvents and at different values of, temperature, pH, etc. Generally, the solubility of a substance depends upon the kind of a solvent, temperature, pH, etc. A soluble substance can start to deposit by dissolving a substance in a solvent capable of dissolving the substance and bringing the thus obtained solution into a condition where the dissolved substance is below the saturated solubility of said substance, for example, by changing the temperature or pH, or by adding to the solution a solvent incapable of dissolving the substance.

As a result of various studies of the solubilities of nucleic compounds, kinds of solvents, pH of the solutions containing said compounds, etc., the present inventors have succeeded in obtaining crystals having a desired shape as described above, by preparing an aqueous solution of a nucleic compound, making one-fifth to three-fourths, preferably one-third to two-thirds of the dissolved substances deposit within 30 minutes, more preferably within 10 minutes, and then allowing the undeposited nucleic compounds to deposit slowly over a period of 1 to 24 hours.

It is preferable to select a suitable condition for carrying out said crystallization based on solubilities of nucleic compounds in an aqueous solution at predetermined pH and temperature as a concrete means, and the selection of such concrete means is very easy for those skilled in the art. For example, nucleic bases are sparingly soluble in solvents other than water, and thus are made to be dissolved in hot water, preferably an aqueous solution of acid having a pH of not more than 2, or an aqueous solution of alkali having a pH of not less than 13. Part of the nucleic bases in the solution can be deposited as very fine crystals by rapidly lowering the temperature, or suddenly changing the pH with an alkali in the case of the an aqueous acidic solution, or with an acid in the case of the an aqueous alkaline solution or by evaporation of ammonia in the case of the a volatile solution such as an aqueous ammoniacal solution, to bring the solution to about the neutral point, or by adding to the solution a water-soluble organic solvent incapable of dissolving nucleic bases, such as methanol, acetone, etc.

Once the crystals have started to deposit, the state of the solution must be changed as slowly as possible, and the crystals must be matured over a period of 1 to 24 hours.

Detailed explanation will be made hereunder with reference to the case of guanine:

Guanine is dissolved in a 1/10 N—HCl aqueous solution and the thus obtained solution is adjusted to a pH of 6 and then allowed to be matured, or the quanine is dissolved in a concentrated $NH_4OH$ aqueous solution at 90°C or higher, and the thus obtained solution is adjusted to a pH of 10–11 by evaporating ammonia from the solution by heating, and then the temperature of the solution is lowered to 40°C within 10 minutes and the formed crystals are allowed to be matured over a period of 24 hours at ordinary temperature, whereby the substances having desired sizes can be obtained.

Both nucleosides and nucleotides are relatively readily soluble in water, and thus it is preferable to skillfully utilize a change in temperature by dissolving them in hot water. Sometimes, it is preferable to accelerate the initial crystallization rate by adding to the solution a water-soluble organic solvent such as methanol ethanol, acetone, or the like. In the case of nucleosides or nucleotides, the pH of the starting aqueous solution may be neutral, alkaline or acidic, but the best results can be obtained with an aqueous solution having a neutral pH. Among these nucleosides and nucleotides, guanosine has the lowest solubility in water, but even in the case of guanosine, about 1 percent by weight of guanosine is soluble in hot water at 80°C or higher, and thus the solution is put into cold water to reduce the crystallization temperature down to 25° – 30°C, and the crystals having a desired shape can be thereby obtained. Further, by maturing the crystals over a period of 5 to 10 hours, crystals having a remarkable pearl luster and such sizes as a width of about 5 microns, a length of about 40 microns and a thickness of about 0.012 micron guanine can be obtained.

In the case of sodium 5'-cytidilate having a high solubility in water, sodium 5'-cytidilate crystals start to crystallize by dissolving it in hot water at 60°C and adding the same volume of methanol as that of the solution within 2 minutes, and then the solution is cooled down slowly to 5°C over a period of about 1 hour by slowly adding methanol to the solution, whereby thin plate shaped crystals having a pearl luster can be obtained.

As explained above, the present invention provide a method comprising dissolving a nucleic compound in water or an aqueous solution, rapidly bringing the thus obtained aqueous solution to less than the saturated solubility of the solute preferably within 30 minutes, and slowly maturing the thus formed initial crystals preferably over a period of 1 to 24 hours. In the present invention, the aqueous solution can be brought to less than the saturated solubility by adding another solvent to the solution, changing the pH of the solution, or changing the temperature, or utilizing a combination of these, but it is natural that the conditions depend upon the kind, solubility and concentration of the nucleic compound and the kind of a solvent to be added. The crystals initially formed under these conditions are thin plate shaped, small ones, but have pearl lusters. The thus formed crystal nuclei grow during the maturing and finally come to have even sizes.

In order to effect rapid and uniform mixing of the solution, it is preferable to employ stirring, for example, with a screw or other means, to the point where water or water-soluble organic solvent is supplied. Sometimes, it is preferable to elevate or lower the temperature of the solution, depending upon the situation. Further, it is observed that addition of the same or different kind of thin plate shaped fine crystals to the solution as a crystallization accelerator is effective in stabilizing the crystallization.

The present method can be readily carried out and crystals having the desired sizes can be obtained in a simple apparatus in a high yield. When the thus obtained crystals are used as pigment raw materials, crystal layers arranged in a laminal state can have a proper light interference and reflection, whereby a product having the desired pearl luster or rainbow-color luster can be obtained. That is to say, the desired pearl luster can be obtained by mixing the thus prepared thin plate-shaped crystals with a solvent incapable of dissolving the crystals, for example, water for such water-insoluble nucleotide salts as calcium 5'-inosinate and calcium 5'-guanylate; water or acetone for such sparingly water- and organic solvent-soluble nucleosides as guanosine; organic solvents such as acetone and ethanol for such highly water-soluble nucleosides as cytidine, and either kneading the resulting mixture into the material desired to have such luster together with the necessary additive, adhesive or the like, or spraying the resulting mixture onto the surface of the material desired to have such luster and drying the treated material.

In that case, the concentration of nucleic compounds to be added depends upon the kind, uses and quality of the desired product, and the pearl luster is more intensified with an increase in concentration, but 0.01 to 1 percent by weight of nucleic compounds is a preferable concentration from the viewpoint of economics as well as appearance.

The method for adding the crystals to the material on which such pearl luster is desired also depends upon the use of the product. For example, in the case of cosmetics such as lipstick or nail polish, it is necessary to distribute the crystals uniformly in the cosmetics, and thus a uniform distribution must be effected in the product by adding the crystals to other raw materials by kneading before the materials become solid. When the present crystals are applied to tableware, for example, cups, dishes, etc. made of synthetic resins such as polystyrene resin and methacrylate resin, it is sometimes preferable owing to the nature of the shaping process to mix them with other raw materials before the shaping is carried out or to effect uniform distribution by mixing them with other raw materials in the course of the shaping process. When the decoration is applied to paper, leather or sheet glass, it is sometimes sufficient to dissolve the crystals in a solvent together with an adhesive, spray the mixture onto the surface of the material on which a pearl luster is desired and drying the treated surface. Further, it is possible to increase the decorative function (as an antonymous sense of the antiseptic function) of such coating materials as paint, lacquer, and enamel paint by mixing the crystals with the coating materials. Furthermore, it is possible to increase the appearance of the surface of paper or fibers by mixing the crystals with a dye or coloring materials.

The nucleic compounds referred to in the present invention include such nucleic bases as uracil, thymine, cytosine, adenine, guanine, hypoxanthine, xanthine and uric acid, and nucleosides and nucleotides containing these nucleic bases as a constituent, and salts and esters of these nucleosides and nucleotides. Accordingly, the pearl luster essences and pigments obtained according to the present invention are quite different from the pearl essences and pigments of lead compounds, and thus are not toxic and have good resistance to chemicals and heat. Consequently, the present pearl essences and pigments can be used in any usual commercial field where a pigment is used, as a pigment raw material or a main component or mere component for the pigment raw material. Further, the present pearl essences and pigments can be safely mixed with cosmetics, food materials, or coated onto porcelain tablewares and toys. Products having no odor but a very beautiful pearl luster can be obtained by such coating, and thus the present pearl essences and pigments are very advantageous.

The present invention will be explained hereunder with reference to the following examples, but these examples are not for limiting the scope of the present invention, but only for illustration of the embodiments of the present invention.

EXAMPLE 1

Fifteen Parts by weight of saturated polyester resin of a low viscosity containing 5 percent by weight of sorbitane monooleate, a lipophilic non-ionic surface active agent (acid component:adipic acid) were added to 100 parts by weight of aqueous uric acid paste having a 55 percent crystal concentration and the resulting mixture was well stirred. Isolated water was removed by decantation, whereby a paste containing 8 percent by weight of water was obtained. The paste was dried under a reduced pressure at 55°C for 3 hours, and 3 parts by weight of the thus obtained, dehydrated paste having a 40 percent crystal concentration were dispersed in 7 parts by weight of nitrobenzene, an organic nitrogen compound solvent, and further one part by weight of 100 percent water-soluble phenol resin was added thereto, well mixed and dissolved. The thus obtained pigment was coated onto a glass plate and slowly dried. When evaporation of solvent was completed over a period of about 30 hours, a film having a good pearl luster was obtained.

EXAMPLE 2

One hundred Parts by weight of aqueous guanosine paste having a 60 percent crystal concentration was flashed with 100 parts by weight of dodecylbenzene sulfonate, an anionic surface active agent, whereby a dehydrated paste having a 60 percent crystal concentration was obtained. Two parts by weight of the dehydrated paste was dispersed in 5 parts by weight of o-dichlorobenzene, and further one part by weight of 100 percent oil-soluble phenol resin was added thereto and dissolved. The thus obtained pigment was coated onto the surface of a spherical urea resin, and when evaporation of the solvent was completed in a semi-closed vessel over a period of about 20 hours, a sphere having a clear pearl luster was obtained.

EXAMPLE 3

One hundred Parts by weight of aqueous calcium 5'-inosinate paste having a 55 percent crystal concentration was flashed with 25 parts by weight of castor oil-modified alkyd resin, whereby a dehydrated paste was obtained. Five parts by weight of the dehydrated paste was well thoroughly with 15 parts by weight of nitrocellulose, and further 7.5 parts by weight of suntolite, 3.8 parts by weight of dibutyl phthalate, 25.3 parts by weight of butyl acetate, 6.4 parts by weight of ethanol, 1.1 parts by weight of butanol, 32.9 parts by weight of toluol and 3.0 parts by weight of coloring material were added thereto and thoroughly mixed, whereby a nail polish having a good luster was obtained.

EXAMPLE 4

Into a vessel provided with a stirrer were placed 100 mg of white powdered of uric acid having a purity of 98.9 percent, which was obtained according to the conventional synthesis method, and 200 ml of an acetic acid solution having a pH of 2, and the uric acid was dissolved in the acetic acid solution by heating on a water bath at 60°C. Water was added dropwise to the vessel with stirring at a rate of 50 ml per minute, and a small amount of fine thin plate-like crystals of uric acid having a size of about one micron was added thereto as a crystallization accelerator just before the initial crystals start to deposit. Then, the rate of water addition was reduced to 10 ml per minute, and the water bath temperature was lowered and the temperature of the solution was slowly lowered down to 5°C over a period of about 30 minutes, whereby the crystals formed were smooth and uniform ones having a pearl luster and a length of 10 – 15 microns, a width of 2 microns and a thickness of about 0.08 micron. The crystals were separated from the solution by filtration and dried. The crystals were made into a paste with a solvent, a dispersing agent, a resin and the like. The paste was applicable for pearl luster coating after proper dilution of the paste.

EXAMPLE 5

Dissolved in 500 ml of an acetic acid solution having a pH of 2 was 1 g of white powdered of uracil having a 99.5 percent purity, which was obtained according to the conventional synthesis method, and the solution was put into a vessel provided with a stirrer. While the solution was stirred at ambient temperature, about 20°C, water was added dropwise thereto at a rate of 30 ml per minute, and fine thin plate-like, needle crystals having size of less than 1 micron started to deposit. At that time, the rate of water addition was reduced to 5 ml per minute and the stirring velocity was extremely lowered and at the same time the temperature of the solution was slowly lowered down to 0°C over a period of about 60 minutes. In that state, the stirring was carried out for two hours, and a clear flow pattern was observed. The crystals at that time were 15 to 20 microns in diameter and had a thickness of about 1 micron, and the crystals were in a needle or short form. The thus obtained uracil thin plate-like crystals were mixed, in a dry state, with resins, and a synthetic resin shaped article having a pearl luster was obtained by shaping operations such as compression molding, injection molding, etc. Further, the crystals were also used in shaping operation after the crystals were made into a paste with a solvent and a dispersing agent.

EXAMPLE 6

One liter of a 0.5 percent suspension solution of white needle crystals of guanosine having a 100.2 percent purity, which was obtained from an yeast nucleic acid, was placed into a vessel provided with a stirrer and a cooling pipe, and the vessel was set in a water bath at 100°C. The crystals were dissolved with stirring, and ethanol was added dropwise to the solution at a rate of 30 ml per minute, and thin plate-like, needle or short form crystals having sizes of less than 5 microns started to deposit. At that time, the rate of ethanol addition was lowered to 5 ml per minute, and the solution was quenched to 0°C over a period of 5 to 10 minutes, and then the stirring was continued at 0°C for about 60 minutes, whereby crystals having a length of 5 microns and a thickness of 1.0 micron were obtained. The crystals were collected by filtration, washed with ethanol and dried with air. An ethanol solution of the crystals showed a flow pattern having an excellent pearl luster or rainbow luster, which ensured the use as the desired pigment. The air-dried crystals was flashed with nitrocellulose to completely effect dehydration, and a product having a brilliant pearl luster was obtained by mixing the dehydrated crystals with cosmetic vehicles such as kastle, vaseline and liquid paraffin.

EXAMPLE 7

Into a vessel provided with a stirrer and a cooling pipe were placed 100 ml of a 20 percent aqueous solution of white powdered cytidine having a 99.8 percent purity, which was prepared from sodium 5'-cytidilate according to the conventional method, and the vessel was set in a water bath at 60°C. Methanol was added dropwise to the solution with stirring at a rate of 50 ml per minute, and a very small amount of thin plate-like crystals of cytidine having sizes of less than 5 microns was added thereto as a crystallization accelerator just before the crystals started to deposit, and further addition of methanol was continued, whereby fine crystals were deposited. At that time, the rate of methanol addition was changed to 10 ml per minute, and the bath temperature was lowered. When the temperature of the solution was slowly lowered to 5°C over a period of 60 minutes, smooth, uniform needle-like, thin plate crystals having the desired sizes and thickness and pearl luster were obtained. A cytidine cake was obtained by filtering the solution, and the cake was flashed with alkyd resin, whereby a complete dehydration was effected. The dehydrated crystals were used as a pigment having a good pearl luster when mixed with various organic extenders.

EXAMPLE 8

Into a vessel provided with a stirrer and a cooling pipe were placed 1 g of calcium 5'-inosinate and 500 ml of water, and the calcium 5'-inosinate was dissolved by keeping the liquid temperature at 80°C. While stirring the solution, ethanol was added dropwise thereto at a rate of 20 ml, and fine thin plate-like crystals having sizes of about 5 microns started to deposit. At that time the rate of ethanol addition was changed to 5 ml per minute, and the temperature of the solution was elevated to 100°C and the stirring was continued. A flow pattern was developed in the solution. In that state, the stirring was continued for 60 minutes. The resulting crystals had a length of 15 to 20 microns. The crystals were collected by filtration, washed with ethanol and dried with air. When the crystals were again suspended in ethanol and stirred, the solution showed a flow pattern having an excellent pearl luster, which ensured the use as the desired pigment. When the thin plate-like crystals were mixed, stirred and kneaded with such cosmetic vehicles as vaseline and Japan tallow, metal soap, coloring material, and a perfume, a good make-up cosmetic was obtained.

EXAMPLE 9 (PREPARATION OF LIPSTICK)

When a lipstick was prepared according to the following prescription, a lipstick having a good pearl luster was obtained:

| | |
|---|---|
| Beeswax | 10.0% by weight |
| Lanolin | 5.0% by weight |
| Carnauba wax | 4.0% by weight |
| Bromic acid | 2.0% by weight |
| Pigment | 10.0% by weight |
| Cetanol | 5.0% by weight |
| Castor oil | 39.0% by weight |
| Ceresine | 4.0% by weight |
| Guanosine (paste) | 20.0% by weight |
| Cosmetic flavor | 1.0% by weight |

EXAMPLE 10 (PREPARATION OF LIQUID ROUGE)

When a liquid rouge was prepared according to the following prescription, a liquid rouge having a good pearl luster was obtained:

| | |
|---|---|
| Ethylcellulose | 3.1% by weight |
| Cytidine in ethanol | 68.4% by weight |
| Petroleum ether | 20.0% by weight |
| Hydrogenated methyl abietate | 7.5% by weight |
| Rhodamine | 1.0% by weight |

EXAMPLE 11 (PREPARATION OF NAIL POLISH)

When a nail polish was prepared according to the following prescription, a nail polish having a good pearl luster was obtained:

| | |
|---|---|
| Uric acid in nitrocellulose | 20.0% by weight |
| Santolite | 7.5% by weight |
| Dibutyl phthalate | 3.8% by weight |
| Butyl acetate | 25.3% by weight |
| Ethanol | 6.4% by weight |
| Butanol | 1.1% by weight |
| Toluol | 32.9% by weight |
| Pigments | 3.0% by weight |

EXAMPLE 12 (PREPARATION OF PEARL SHEET)

A mixture having the following composition was thoroughly mixed, and the mixture was kneaded on an open roll at about 170°C and subjected to sheeting in a calender roll to prepare a pearl sheet:

| | |
|---|---|
| Polyvinyl chloride resin | 100 parts by weight |
| Dioctyl phthalate | 48 parts by weight |
| Cadmium stearate | 0.7 parts by weight |
| Barium stearate | 0.5 parts by weight |
| Guanine (thin plate-shaped crystals) | 2.0 parts by weight |

Color of the heretofore commercially available pearl sheet was changed to black by immersing it in 0.1 mol/l of hydrogen sulfide, but the color of the sheet prepared according to the present invention was never changed to black. The reason was that the conventional pearl sheet was prepared from the pearl pigment consisting essentially of basic lead carbonate or acidic lead arsenate.

EXAMPLE 13

Into 2.5 kg of liquid, unsaturated heat-setting polyester resin dispersed 15 g of guanine crystals having a pearl luster, and 25 g of a hardening accelerator was added to the mixture and sufficiently dissolved in the resin. Then, 25 g of a 60 percent by weight methyl ethyl ketone peroxide solution was added to the mixture and stirred. The mixture was then immediately poured into a drum type centrifuge injection machine having a diameter of 55 cm and a length of 50 cm, and shaping was effected at a drum temperature of 35° – 36°C and a number of drum revolutions of 100 rpm. After about 30 minutes from the shaping, semi-cured sheet-shaped polyester resin was taken out of the drum, and immersed in hot water to effect complete curing. A polyester sheet having a pearl luster was obtained. When the thus prepared sheet was compared with the conventional sheet prepared from the pearl essence consisting essentially of lead carbonate, the conventional sheet had a deterioration of pearl luster by hot water curing, whereas the sheet prepared according to the present invention had no deterioration of the luster at all.

EXAMPLE 14

Three eggs were placed in a dry vessel after the eggshells were removed, and 85 g of sugar was added thereto. Thorough foaming was effected with a whipper, and one drop of vanilla essence and 85 g of wheat flour were added thereto and mixed. Then, 30 g of heat-melted butter was added thereto and mixed. Then, the liquid mixture was poured into a cake having a diameter of 18 cm. and baked for 15 minutes in an oven heated in advance, after the surface of the cake was flattened. When solution mixtures of 1 ml of a 20 percent by weight suspension of thin plate-shaped crystals of the following nucleic compounds and 50 ml of honey prepared in advance were uniformly applied to the upper surfaces (each surface area: 254 cm²) of the baked cakes, sponge cakes having an excellent surface luster were obtained:

| Nucleic compounds | Length (microns) | Width (microns) | Thickness (microns) |
|---|---|---|---|
| Guanosine | 25–30 | 15 | about 0.1 |
| Guanine | 10–15 | 3 | about 0.07 |
| Guanine-HCl | 10–15 | 5 | about 0.07 |
| Inosine | 15–20 | 10 | about 0.07 |
| Cytosine | 30–40 | 30–40 | about 0.1 |

EXAMPLE 15

Coating solutions prepared from 10 ml of the white of an egg and 1 ml of a 20 percent by weight aqueous suspension of platelet-like crystals of the following nucleic compounds were uniformly applied to the surfaces (each surface area: 180 cm²) of boiled fish-pastes (Kamaboko) prepared from 20 kg of minced flesh of pollack, 35 kg of minced flesh of Sciaena schlegelii, 3 kg of starch, 1 kg of the white of egg, 1.5 kg of salt and 0.5 kg of Super 04 (a trademark) and dried with hot air at 80°C, whereby the boiled fish-pastes (Kamaboko) having a good surface luster were obtained.

| Test No. | Nucleic compounds | Length (microns) | Width (microns) | Thickness (microns) |
|---|---|---|---|---|
| 1 | Guanosine | 25–30 | 15 | about 0.1 |
| 2 | Guanine | 10–15 | 3 | about 0.07 |
| 3 | Adenosine | 30–40 | 15–20 | about 0.07 |
| 4 | Hypoxanthine | 10–15 | 5 | about 0.1 |
| 5 | Cytosine | 30–40 | 30–40 | about 0.1 |

When the organoleptic test of lusters of said fish-pastes was carried out by a panel of 20 well-trained members, the following result was obtained.

| Samples | | Numbers of members who preferred the luster of A to that of B |
|---|---|---|
| A | B | |
| Test No. 1 | Control | 20 |
| Test No. 2 | Control | 18 |
| Test No. 3 | Control | 16 |
| Test No. 4 | Control | 18 |
| Test No. 5 | Test No. 1 | 11 |

EXAMPLE 16

A sponge cake was prepared in the same manner as in Example 14, and a solution mixture containing 20 g of molten chocolate and 1 ml of a 20 percent by weight aqueous suspension of guanosine thin plate-shaped crystals (length: about 15 microns; width: about 30 microns; thickness: about 0.1 micron) was uniformly coated onto the upper surface of the sponge cake (surface area: 254 cm²), whereby a chocolate cake having an elegant luster was obtained.

EXAMPLE 17

Four hundred ml of vinegar, 12 g of table salt, 3 g of pepper, and 10 g of whipped mustard were well mixed, and further 800 ml of salad oil, 20 g of paprika, 200 g of onion juice, and 400 ml of tomato catsup were added thereto. Finally, 8 ml of a 20 percent by weight aqueous suspension of guanosine platelet-like crystals (length:about 15 microns, width:about 30 microns; thickness:about 0.1 micron) was added thereto. The thus prepared french dressing had considerably better luster than that of the sample containing no guanosine.

When the organoleptic test of the lusters was carried out with a panel of 20 well-trained members, all members preferred the luster of the dressings containing guanosine and also put better marks thereon with respect to the acceptability.

EXAMPLE 18

Twenty-five kg of fresh juice (solid content: 10.3 percent by weight) was squeezed out of 200 kg of well-washed oranges, and 20 kg of the juice was concentrated in a Mejonnier Lo-temp type concentrator, whereby 3.1 kg of concentrate (solid content: 65.8 percent by weight) was obtained. Then, 2.2 kg of the fresh juice and 0.05 kg of a 10 percent by weight aqueous suspension of guanine platelet-like crystals were added thereto, whereby 5.3 kg of concentrated orange juice having an elegant freshness was obtained.

EXAMPLE 19

Two ml of a 5 percent by weight aqueous suspension of guanosine platelet-like crystals having smooth surfaces (length:about 30 microns; width:about 15 microns; thickness:about 0.1 micron) was mixed with 100 ml of whisky, and well stirred, whereby whisky having a flow pattern of elegant freshness was obtained when stirred.

We claim:

1. A synthetic nacreous pigment, which consists essentially of at least one thin plate-shaped crystal having a length of 3 to 100 microns, a width of 1 to 40 microns, and a thickness of 0.05 to 3 microns, said crystal being composed of one compound selected from the group consisting of nucleic bases, and nucleosides and nucleotides thereof.

2. A synthetic nacreous pigment according to claim 1, wherein the compound is a nucleic base.

3. A synthetic nacreous pigment according to claim 1, wherein the compound is a nucleoside.

4. A method for preparing pearl essences and pigments having a smooth surface and excellent luster, which consists essentially of preparing an aqueous solution of one compound selected from the group consisting of nucleic bases, and nucleosides and nucleotides thereof, crystallizing out one-fifth to three-fourths of the compound in said aqueous solution within 30 minutes, allowing the thus obtained crystals to mature over a period of 1 to 24 hours and separating the thus obtained matured crystals.

5. A method for imparting a pearl luster to a material which consists essentially of adding to said material a pigment consisting essentially of at least one thin plate-shaped crystal having a length of 3 to 100 microns, a width of 1 to 40 microns and a thickness of 0.05 to 3 microns, said crystal being composed of one compound selected from the group consisting of nucleic bases, said nucleosides and nucleotides thereof.

6. A method according to claim 5, wherein the compound is a nucleic base.

7. A method according to claim 5, wherein the compound is a nucleoside.

8. A method for preparing pearl essences and pigment bases, which consists essentially of one member selected from the group consisting of nucleosides and nucleotides in hot water at at least 60°C, rapidly cooling the resulting solution until fine crystals have been initially deposited, and then slowly cooling the solution to deposit thin plate-shaped crystals having smooth surfaces and a width of 3 to 100 microns and a thickness of 0.05 to 1.0 micron.

9. A method for depositing crystals having smooth surfaces and a width of 3 to 100 microns and a thickness of 0.05 to 1.0 micron for pearl essences and pigment bases, which consists essentially of dissolving a nucleic base in an aqueous solution which is acid and has a pH of at most 2 or is alkaline with a pH of at least 13, rapidly depositing fine crystals by neutralization, and then slowly adjusting the rate of deposition thereby to mature the deposited crystals.

10. A method for depositing crystals having smooth surfaces and a width of 3 to 100 microns and a thickness of 0.05 to 1.0 micron for pearl essences and pigment bases, which consists essentially of dissolving one member selected from the group consisting of nucleosides and nucleotides in hot water at at least 60°C, adding a water-soluble organic solvent to the solution, until fine crystals have been initially deposited, and then slowly adjusting the rate of deposition thereby to mature the deposited crystals.

* * * * *

UNITED STATES PATENT OFFICE
CERTIFICATE OF CORRECTION

Patent No. __3,692,768__   Dated __September 19, 1972__

Inventor(s) __Toyoharu Takata, et. al.__

It is certified that error appears in the above-identified patent and that said Letters Patent are hereby corrected as shown below:

On the cover sheet in the heading [30], "June 15, 1969" should read -- June 15, 1968 -- .

Signed and sealed this 20th day of March 1973.

(SEAL)
Attest:

EDWARD M.FLETCHER,JR.   ROBERT GOTTSCHALK
Attesting Officer        Commissioner of Patents